Patented July 1, 1952

2,602,092

UNITED STATES PATENT OFFICE 2,602,092

SYNTHESIS OF COMPOUNDS HAVING VITAMIN A ACTIVITY

William Oroshnik, Plainfield, N. J., assignor to Ortho Pharmaceutical Corporation, a corporation of New Jersey No Drawing. Application March 5, 1948, Serial No. 13,338

34 Claims. (Cl. 260—611)

This invention relates to compositions of matter and to methods for preparing the same. This invention particularly relates to compounds which are derivatives of $\alpha$-ionone and of $\alpha$-ethynyl-$\alpha$-ionol and to methods of preparing the said derivatives.

It is an object of this invention to prepare compounds to be used as intermediates in the preparation of compounds having vitamin A activity.

It is another object of this invention to prepare compounds having vitamin A activity.

It is still another object of this invention to prepare compounds having the same number of carbon atoms and the same configuration with respect to carbon atoms as vitamin A ethers.

It is another and further object of this invention to prepare compounds having vitamin A activity which are analogues of vitamin A.

It is still another object of this invention to prepare compounds having the same number of carbon atoms and the same configuration with respect to carbon atoms as vitamin A ethers and the same number of hydrogen atoms as vitamin A ethers.

Other objects of this invention will be apparent from the description following and from the appended claims.

The chemical constitution and configuration of vitamin A has been known for a number of years, and heretofore it has been considered that vitamin A activity was inherent only in a structure which had five conjugated double bonds and that in this system of five conjugated double bonds one must be in the beta position in the ionone ring.

It has now been discovered that a compound containing only four conjugated double bonds and in which the double bond in the ionone ring is in the alpha position has vitamin A activity.

I have now discovered certain new derivatives of $\alpha$-ionone and of $\alpha$-ethynyl-$\alpha$-ionol and methods for their preparation; these derivatives may be prepared in excellent yields and they may be prepared free from impurities and stable to distillation.

It has been further discovered that the said derivatives of $\alpha$-ionone and $\alpha$-ethynyl-$\alpha$-ionol may be hydrogenated and dehydrated; or isomerized, hydrogenated, and dehydrated; or hydrogenated, isomerized, and dehydrated, to form additional derivatives which have vitamin A activity.

In the practice of this invention, $\alpha$-ethynyl-$\alpha$-ionol

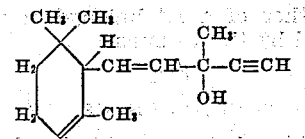

Compound I may be prepared in a number of different ways and in particular by reacting $\alpha$-ionone with calcium or lithium acetylide in an inert solvent in a manner analogous to that set forth in my U. S. Patent No. 2,425,201, filed September 11, 1945, and issued August 5, 1947; and in my copending application Serial No. 655,607, filed March 19, 1946, now Patent No. 2,472,310. Sodium and potassium may also be used in this reaction but the yield of Compound I is low.

In the practice of this invention an acetylenic carbinol,

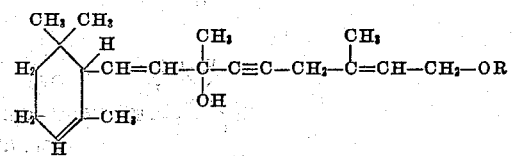

Compound II in which R is a hydrocarbon radical, is prepared by a first reaction between $\alpha$-ethynyl-$\alpha$-ionol and a reagent such as a metal alkyl in which the metal is a member of the first group, preferred reagents being methyl lithium and butyl lithium, or a metal alkyl in which the metal is a member of the second group such as zinc or magnesium. When zinc is the metal, the reagent may be a zinc dialkyl such as dimethyl zinc or an alkyl zinc iodide such as methyl zinc iodide, and when magnesium is the metal, the reagent may be a dialkyl magnesium such as dimethyl magnesium or a Grignard reagent such as ethyl magnesium bromide. The Grignard reagent is preferred.

The reagent may be considered as having the following general formula: $(R')_xMY$, in which R' is a hydrocarbon radical such as methyl, ethyl, benzyl, and the like; $x$ is an integer not greater than two; M is a metal having a valence not greater than two, and Y is a halogen if $x$ is one and the valence of the metal is two; but Y is nonexistent if M is a metal having a valence of one or if M is a metal having a valence of two and $x$ is two.

The product of this first reaction is represented by the formula,

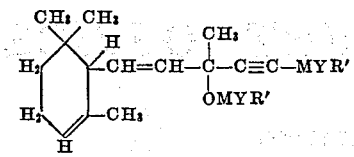

in which M, Y, and R' have the same significance as above; but in which Y and R' are nonexistent if M is a metal having a valence of one, R' is nonexistent if M is a metal having a valence of two and Y is a halogen, and Y is nonexistent if M is a metal having a valence of two and R' is a hydrocarbon radical. In the preferred embodiment MY is MgBr and R' is nonexistent or M is a metal having a valence of one and Y and R' are nonexistent. In the single preferred practice or embodiment, MY is MgBr and R' is nonexistent.

The product of the first reaction is reacted with an ether of a 1,4 halohydrin of isoprene represented by the formula,

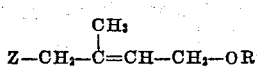

in which Z is a halogen and R is a hydrocarbon radical, and in which, in the preferred form, R is —CH₃. This reaction is made in a solvent; satisfactory solvents include ether, benzene, tetrahydropyran, and tetrahydrofuran. The preparation of this reagent is described in my copending U. S. application Serial No. 633,873, filed December 8, 1945, now Patent No. 2,541,091.

This last reaction with the ether of a 1,4 halohydrin of isoprene is preferably catalyzed by a salt capable of reacting with a Grignard reagent such as cuprous bromide, cuprous chloride, cuprous iodide, cuprous cyanide, cupric chloride, cobalt chloride, ferric chloride, and cupric bromide, but anhydrous cupric chloride is preferred. The product of this reaction, before hydrolysis, is present in solution and corresponds to the formula

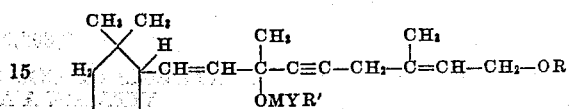

in which M, Y, and R' have the same meaning as above and which in the preferred form MY is MgBr, R' is nonexistent, and R is —CH₃.

Hydrolysis of the reaction mixture containing this compound in solution may be accomplished by any of the usual methods used for the hydrolysis of a Grignard reaction mixture, such as treating with dilute acids, water, or preferably with a solution of a water-soluble ammonium salt which has been made slightly alkaline, pH 7.5 to 9.0, by the addition of aqueous ammonium hydroxide. Upon hydrolysis of the reaction mixture, a compound is formed having the formula of Compound II.

After the hydrolysis is complete, unreacted reagent containing halogen is removed, and for this purpose, a base is employed. Inorganic bases such as alcoholic sodium hydroxide and potassium hydroxide or organic bases such as diethylamine may be used. The following equations illustrate the process for the preparation of Compound II:

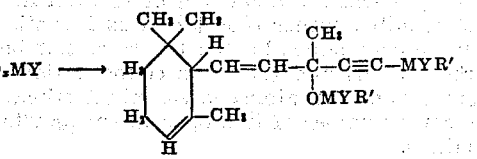

Compound I

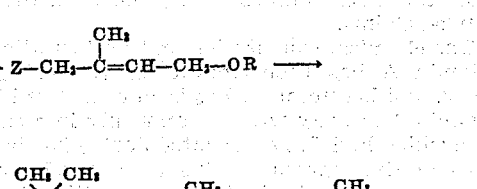

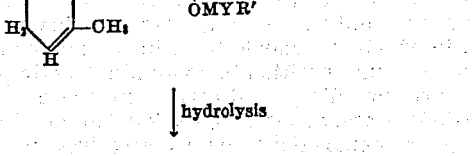

↓ hydrolysis

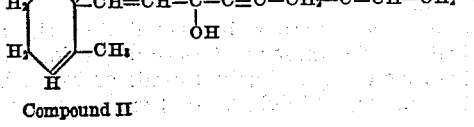

Compound II

The acetylenic bond of Compound II may be reduced to a double bond, and the resulting substance has the following structure,

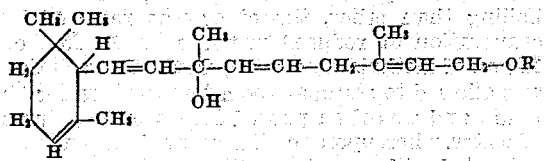

Compound III in which R is a hydrocarbon radical.

In the conversion of Compound II to Compound III, catalytic hydrogenation may be used, and in this case it has been found that poisoned palladium supported on calcium carbonate, Raney nickel, or poisoned Raney nickel are satisfactory. Raney nickel may be satisfactorily poisoned by a cadmium salt, a zinc salt which forms a soluble complex in methyl alcohol with an amine, piperidine, pyridine, thiourea, aminothiazoles, or a combination of zinc acetate and piperidine; however, Raney nickel poisoned by a combination of zinc acetate and piperidine is the preferred catalyst. It is also possible to reduce by chemical reagents, but catalytic hydrogenation is preferred.

Compound II may be distilled in a vacuum in the absence of any traces of acidic substances, and when so distilled, there is substantially no dehydration during the distillation. If a trace of an acidic substance is present, partial or complete dehydration of Compound II may occur during the distillation.

Compound II may be treated with a strongly alkaline substance such as sodium or potassium hydroxide or alkoxide in an alcohol, or a quaternary ammonium hydroxide, at room temperature or above, and this brings about a shift in the position of the bonds. The product of this alkali treatment is probably represented by the following formula,

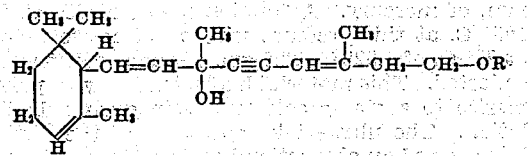

Compound IV wherein R is a hydrocarbon radical.

The triple bond in Compound IV is readily reduced by the same means as have been formerly discussed, and the resultant product is probably represented by the following formula,

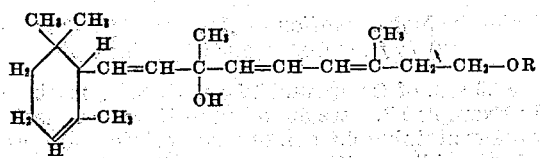

Compound V wherein R is a hydrocarbon radical.

Compound V may be simultaneously subjected to allylic rearrangement and dehydration in the presence of a dehydrating agent. Dehydrating agents which have been found suitable include an acid chloride in an organic base and specifically benzoyl chloride in pyridine and acetyl chloride in dimethylaniline; glacial acetic acid; glacial acetic acid and formic acid; glacial acetic acid and potassium acetate; and aqueous acetic acid. Dehydration with the above reagents may be accomplished at room temperature or slightly above. Other dehydration reagents found suitable include toluenesulfonic acid, oxalic acid, glacial acetic acid, catalytic quantities of iodine, phenyl isocyanate, excess Grignard reagent, and phenyl isocyanate with catalytic quantities of Grignard reagent. Dehydration with these reagents is accomplished in benzene at the boiling temperature of benzene. The dehydration may also be accomplished by heating in the presence of excess Grignard reagent in a mixture of xylene and ether at a temperature of 55° C. to 80° C. The product of allylic rearrangement and dehydration has vitamin A activity.

Compound III may be isomerized by treatment at or above room temperature with a strongly alkaline substance such as sodium or potassium hydroxide or alkoxide in an alcohol, or a quaternary ammonium hydroxide, and the product of the isomerization is probably represented by the following formula,

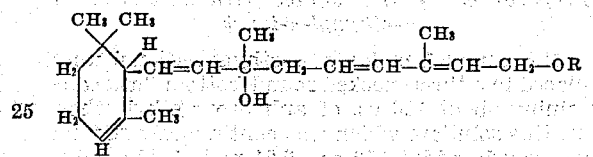

Compound VI wherein R is a hydrocarbon radical. The alkali-isomerized product has vitamin A activity. Compound VI is stable in the absence of acidic substances and may be dehydrated by using any of the reagents for dehydration which are listed above in connection with the dehydration of Compound V. The dehydration of Compound VI yields a material having vitamin A activity.

Compound III may also be dehydrated by methods similar to those employed for the dehydration of Compound V and Compound VI.

In the following specific examples for carrying out the reactions outlined above, the compounds will be referred to by numbers used in the above description.

The following examples are given merely to illustrate specific ways in which the invention may be practiced, and it is to be understood that the invention is not to be restricted or limited thereby.

EXAMPLE I

*Preparation of α-ethynyl-α-ionol (Compound I)*

A two-liter round-bottom flask equipped with a stirrer and containing about two-thirds of a liter of liquid ammonia was cooled in a Dry Ice bath to about −40° or below. Acetylene gas which had been freed from acetone by passage through concentrated sulfuric acid and dried by passage through sodium hydroxide and calcium chloride was led into the reaction flask. Eight grams (1.14 moles) of lithium metal, cut into small pieces and having at least one freshly cut surface, were added piecemeal to the ammonia. When all of the lithium had reacted, 350 cc. of dry ether were added, and this was followed by the addition of 192 grams (1 mole) of α-ionone by means of a dropping funnel. The addition of acetylene was stopped and stirring was continued for three hours at −40° C. to −35° C. after which time 100 grams of ammonium chloride were added. The flask was then removed from the cooling bath, and the ammonia was evaporated as thoroughly as possible. 150 cc. of ether and 500 cc. of water were then carefully added. The reaction mixture formed two layers. The ether layer was removed, washed with water, and dried over anhydrous potassium carbonate. The ether was evaporated, and the residue was treated with 75 gm. (1 mole) of semicarbazide and 5 cc. of glacial acetic acid in 1 liter of methanol. After 24 hours the mixture was poured into a large volume of water and extracted with petroleum ether. After drying over anhydrous potassium carbonate, the petroleum ether extract was distilled under reduced pressure. The fraction boiling at 89° C. and at 0.55 mm. of mercury pressure had a refractive index of $n_D^{20}$ 1.4937 and weighed 146 gm. Carbon and hydrogen analyses gave the following results: calculated for $C_{15}H_{22}O$ C=82.51%, H=10.16%; found, C=82.50%, H=10.14%.

EXAMPLE II

*Preparation of the double Grignard salt of α-ethynyl-α-ionol*

21.8 gm. (0.1 mole) of α-ethynyl-α-ionol were placed in a three-necked round-bottom flask containing about 120 cc. of anhydrous ethyl ether. To this solution, which was continuously stirred, was slowly added 113 cc. (0.21 moles) of a solution of ethyl magnesium bromide in ethyl ether containing 1.86 moles per liter of the reagent. After completion of this addition, the mixture was heated to boiling while being constantly stirred and was refluxed for a period of approximately 30 minutes. A reaction product having the formula

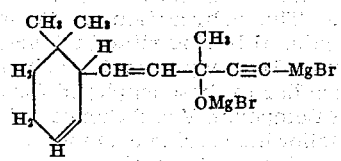

is then present in the reaction mixture in solution in the ether. This compound may be isolated from the reaction mixture in any convenient manner.

EXAMPLE III

*Condensation of α-ethynyl-α-ionol double Grignard salt with 1-chloro-2-methyl-4-methoxybutene-2 to form Compound II (methoxy)*

16 gm. (1.18 moles) of 1-chloro-2-methyl-4-methoxybutene-2 were added to the reaction mixture from Example II after the latter had been allowed to cool to room temperature. This addition was followed by the addition of approximately 0.5 gm. of anhydrous cupric chloride as a catalyst. The mixture was stirred under a reflux condenser, heated to boiling, and kept at a boiling temperature under reflux for approximately six hours (after the second hour two layers were present) and then allowed to cool to room temperature and stirred for fifteen hours.

The reaction mixture was hydrolyzed by first chilling the stirred flask contents to −20° C. and then adding slowly and cautiously about 200 cc. of 30% aqueous ammonium acetate solution containing 5% of 28% ammonia water. (30% aqueous ammonium chloride solution or 5% aqueous acetic acid may also be used, and the procedure is the same.) The reaction mixture was allowed to come to room temperature and was stirred until all solid material had dissolved, then separated into two layers. The ether layer was treated to remove any unreacted halide reagent (methyl ether of the 1,4 chlorohydrin of isoprene). This was accomplished by adding 15 gm. of diethylamine to the wet ethereal solution of the crude condensation product. Since the amine is higher-boiling than ether, the ether was removed by evaporation at reduced pressure and a further 15 gm. of diethylamine were added. The solution was allowed to stand at room temperature for 10 hours and was then poured into a large volume of water, whereupon an oil separated out and was extracted with petroleum ether. The petroleum ether solution was separated from the aqueous layer and was then washed with water several times and finally with an aqueous solution of sodium carbonate. The solution was dried with anhydrous potassium carbonate or other suitable drying agent and filtered; the filtrate was concentrated under vacuum at room temperature. The concentrate consisted essentially of Compound II and was distilled at 0.001 mm. of mercury pressure. The product distilled at from 105° C. to 115° C. and had a refractive index at 20° C. of 1.5040. It showed only end absorption in ultra-violet with a maximum between 2070 A° and 2090 A°. Carbon and hydrogen analyses gave the following results: calculated for $C_{21}H_{32}O_2$, C=79.69%, H=10.19%; found C=79.73%, H=10.25%.

EXAMPLE IV

*Alkali isomerization of Compound II (methoxy) to produce Compound IV (methoxy)*

52 gm. of Compound II (methoxy) were dissolved in 600 cc. of 10% sodium hydroxide in methanol. This solution was allowed to stand at room temperature under nitrogen for forty-eight hours. The solution after standing was poured into a large volume of water and extracted with petroleum ether. The petroleum ether layer was separated, dried, and concentrated under reduced pressure. A yellow oily liquid remained which was distilled at a pressure of 0.001 mm. of mercury. A fraction boiled at 95° C. to 105° C. at this pressure with a refractive index at 20° C. of 1.5223. 32.2 gm. of the product were collected. This material had a tendency to polymerize to a glassy colorless resin during distillation. The ultra-violet spectrum of the distillate showed an absorption band with a maximum at 2280 A° and a molecular coefficient of extinction of 19,500. Carbon and hydrogen analyses gave the following results: calculated for $C_{21}H_{32}O_2$, C=79.69%, H=10.19%; found, C=79.75%, H=10.24%.

EXAMPLE V

*Catalytic hydrogenation of Compound IV (methoxy) to form Compound V (methoxy)*

10.3 gm. of Compound IV (methoxy), obtained in Example IV, were dissolved in 150 cc. of methanol containing 0.4 gm. of zinc acetate and 6 cc. of piperidine. Three grams of water-moist, roughly-blotted Raney nickel were added, and the mixture was hydrogenated under atmospheric pressure until the theoretical amount of hydrogen required to convert the acetylenic bond to an ethylenic bond had been absorbed. The reaction mixture was filtered, poured into water, and extracted with petroleum ether. The dried extract was concentrated, and the residue was distilled at a pressure of 0.001 mm. of mercury. The bulk of the distillate weighed 10 gm. and had a refractive index at 20° C. of 1.5091; it boiled at 107° C. to 120° C. The ultra-violet spectrum showed absorption bands with maxima at 2070

A° and 2370 A° and a molecular coefficient of extinction at 2370 A° of 14,600. Carbon and hydrogen analyses gave the following results: calculated for $C_{21}H_{34}O_2$, C=79.19%, H=10.76%; found, C=79.16%, H=10.93%.

EXAMPLE VI

*Dehydration of Compound V (methoxy) by means of phenyl isocyanate and ferric chloride*

10.5 gm. of Compound V (methoxy) obtained as in Example V were dissolved in 60 cc. of dry benzene. 0.1 gm. of anhydrous ferric chloride and 15 cc. of phenyl isocyanate were added. The mixture was then refluxed for 1¼ hours. There was a copious precipitate of diphenylurea which was filtered off, and the filtrate was then distilled at a pressure of 0.001 mm. of mercury. During the distillation there was some decomposition, and as a result of this, the pressure for a short period of time increased to 0.3 mm. of mercury. The distillation was continued until no more distillate was obtained. The total distillate was dissolved in petroleum ether, filtered, and redistilled at 0.001 mm. of mercury pressure. The bulk of this distillate was collected at 110° C. and had a refractive index at 20° C. of 1.5794. The ultra-violet spectrum showed an absorption band with maxima at 3110 A° and 3250 A° and molecular coefficients of extinction of 47,700 and 39,600 respectively.

EXAMPLE VII

*Dehydration of Compound V (methoxy) by means of para-toluene sulfonic acid monohydrate in glacial acetic acid*

8.8 gm. of Compound V (methoxy) were dissolved in 50 cc. of glacial acetic acid. 100 mg. of para-toluene sulfonic acid monohydrate in 10 cc. of glacial acetic acid were added, and the solution was kept at room temperature for one-half hour and then at 37° C. for 2½ hours. It was poured into water, extracted with petroleum ether, and the petroleum ether solution was washed with dilute ammonium hydroxide, dried over potassium carbonate, and concentrated under vacuum until all of the solvent was removed. The residue from the concentration was distilled at 0.001 mm. of mercury pressure. Three fractions were taken: fraction three, distilling above 115° C., weighed 4.3 gm. and had a refractive index at 20° C. of 1.5247. This fraction consisted of a mixture of the dehydrated product in addition to some original undehydrated material. Its ultra-violet spectrum showed an absorption band with a maximum at 2370 A° and an absorption band with a maximum at 3100 A° and a plateau at 3200 A° to 3250 A°.

EXAMPLE VIII

*Hydrogenation of Compound II (methoxy) to form Compound III (methoxy)*

23.6 gm. of Compound II (methoxy) were dissolved in 200 cc. of methanol containing 300 mg. of zinc acetate and 5 cc. of piperidine. Five grams of moist Raney nickel were added, and hydrogenation was accomplished at atmospheric pressure and was continued until the theoretical amount of hydrogen necessary to convert the acetylenic bond to an ethylenic bond had been absorbed. The reaction mixture was filtered, poured into water, and extracted with petroleum ether. The dried extract was concentrated under reduced pressure; the residue was distilled at .001 mm. of mercury pressure. A distillate amounting to 22.7 gm. was collected at a temperature of from 105° C. to 115° C., and this distillate had a refractive index at 20° C. of 1.5040. Its ultra-violet absorption spectrum showed only a peak at 2070 A°.

EXAMPLE IX

*Isomerization of Compound III (methoxy) to produce Compound VI (methoxy)*

An undistilled concentrate containing 59.8 gm. of Compound III (methoxy) as obtained according to Example VIII was added to a solution of sodium methylate in methanol obtained by reacting 68 grams of sodium with one liter of methanol. The resulting solution was refluxed for 6½ hours and was then poured into a large excess of water and extracted with petroleum ether. The petroleum ether solution was dried over potassium carbonate, filtered, and concentrated under reduced pressure. The residual liquid was distilled at 0.001 mm. of mercury pressure. The fraction which distilled at 110° C. weighed 46 gm. and had a refractive index at 20° C. of 1.5162. The ultra-violet spectrum of fraction four showed an absorption band with maximum at 2410 A° and a molecular coefficient of extinction of 20,000. Carbon and hydrogen analyses gave the following results: calculated for $C_{21}H_{34}O_2$, C=79.19%, H=10.76%; found, C=79.39%, H=10.91%.

EXAMPLE X

*Dehydration of Compound VI (methoxy) by means of phenyl isocyanate*

50 ml. of phenyl isocyanate and 20 ml. of ligroin, boiling point 68° C. to 78° C., were added to 5 gm. of Compound VI. The mixture was heated to reflux (100° C.), and refluxing was continued for 1½ hours. The mixture was then distilled, whereby the unreacted phenyl isocyanate was removed at a pressure of 12 mm. of mercury. The residue was then dissolved in 100 cc. of 5% absolute ethanol, and the mixture was then warmed at 40° C. for one hour in order to destroy any remaining phenyl isocyanate. This solution was poured into water, and the oily material was extracted with petroleum ether. The petroleum ether solution was dried over potassium carbonate, filtered, and the petroleum ether was removed by evaporation under reduced pressure. The residue was distilled at 0.001 mm. of mercury pressure. 3.2 gm. of distillate were collected at a temperature of from 105° C. to 115° C. and had a refractive index at 20° C. of 1.5614. The ultra-violet spectrum showed absorption bands with maxima at 2350 A°, 3100 A°, and 3250 A° and molecular coefficients of extinction at the last two bands of 31,800 and 27,100 respectively.

EXAMPLE XI

*Dehydration of Compound VI (methoxy) by means of para-toluene sulfonic acid in benzene*

5.4 gm. of Compound VI (methoxy) were dissolved in 100 cc. of dry benzene. 25 mg. of para-toluene sulfonic acid monohydrate were added, and the mixture was refluxed under a water separator for one-half hour, during which time about 80% of the theoretical amount of water was collected in the trap. The reaction mixture was then poured into water and extracted with petroleum ether. The extract was washed with a dilute solution of potassium carbonate, dried over potassium carbonate, and concentrated under vacuum until all benzene had been removed. The ultra-violet absorption spectrum of this concentrate showed maxima at 3100 A° and 3220 A° and molecular coefficients of extinction at these wavelengths of 29,700 and 27,000 respectively.

EXAMPLE XII

*Dehydration of Compound VI (methoxy) by means of iodine in benzene*

5 gm. of Compound VI (methoxy) were dissolved in 100 cc. of dry benzene containing 50 mg. of dissolved iodine, and the mixture was refluxed under a water separator for one-half hour and then concentrated under vacuum. The concentrate was added to 100 cc. of 3% methanolic sodium hydroxide, and the mixture was refluxed one-half hour. This treatment removed all organically bound iodine. The mixture was then poured into water and extracted with petroleum ether; the extract was dried over potassium carbonate, concentrated under vacuum and distilled at a pressure of 0.001 mm. The bulk of the distillate was collected between 105° C. and 115° C. as a heavy yellow oil; it weighed 4.4 gm. and had a refractive index at 20° C. of 1.5632. Its ultra-violet absorption spectrum showed maxima at 3100 A° and 3250 A° and molecular coefficients of extinction at these wavelengths of 33,300 and 28,000 respectively.

Many quantities and details of procedure may be varied substantially without departing from the principles of this invention and it is therefore to be understood that the scope of the patent granted on this invention is not to be limited otherwise than necessitated by the scope of the appended claims.

What is claimed is:

1. The method comprising hydrogenating a compound of the formula

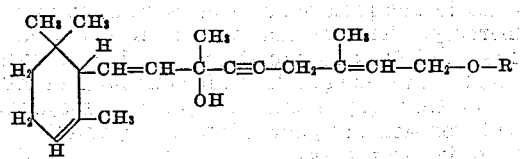

in which R is an alkyl radical, to produce a compound of the formula

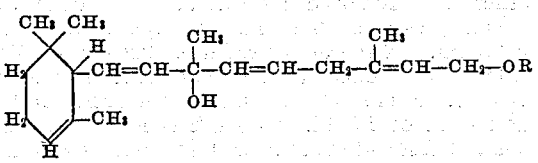

in which R is an alkyl radical.

2. The method comprising hydrogenating a compound of the formula

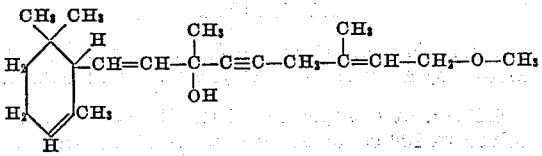

to produce a compound of the formula:

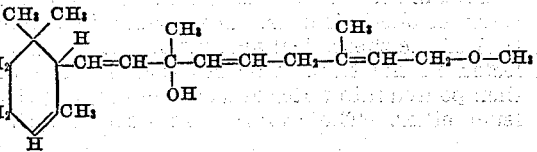

3. A novel compound of the formula

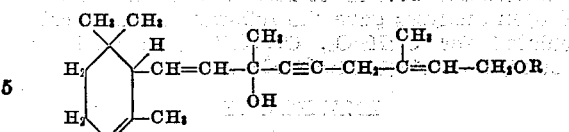

in which R is an alkyl radical.

4. A novel compound of the formula

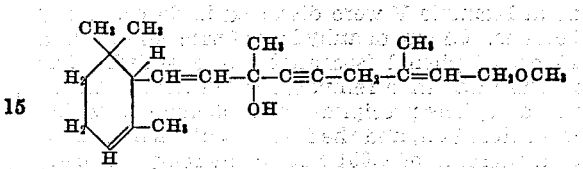

5. A novel compound of the formula

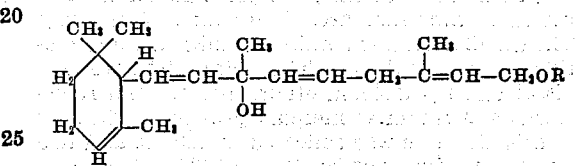

in which R is an alkyl radical.

6. A novel compound of the formula

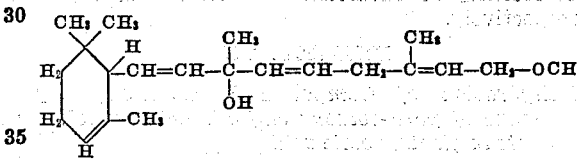

7. A novel compound of the formula

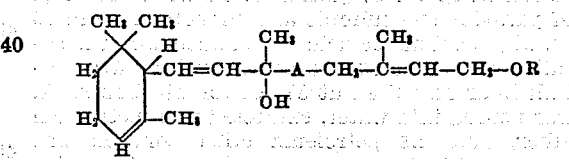

in which A is selected from the group consisting of the radicals —C≡C— and —CH=CH—, and in which R is an alkyl radical.

8. The method comprising reacting α-ethynyl-α-ionol with a reagent selected from the group consisting of R'Li, R'MgX, R'ZnX, R'₂Mg, and R'₂Zn, in which R' is a lower alkyl radical and X is halogen, to produce an intermediate of the formula

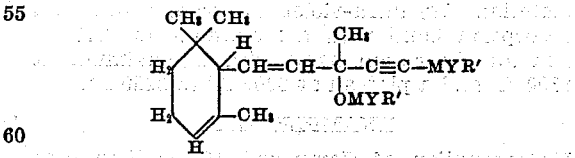

in which M is a metal selected from the group consisting of Li, Mg, and Zn; Y is a halogen and R' is a lower alkyl radical, but in which Y and R' are nonexistant if M is Li, R' is nonexistant if M is Mg or Zn and Y is a halogen, and Y is nonexistant if M is Mg or Zn and R' is a lower alkyl radical.

9. A method according to claim 8 in which the reagent is R'MgX.

10. A method according to claim 8 in which the reagent is methyl lithium.

11. A method according to claim 8 in which the reagent is ethyl magnesium bromide.

12. The method comprising reacting α-ethynyl-α-ionol with a reagent selected from the group consisting of R'Li, R'MgX, R'ZnX, R'₂Mg, and R'₂Zn, in which R' is a lower alkyl radical and X is a halogen, to produce an intermediate of the formula,

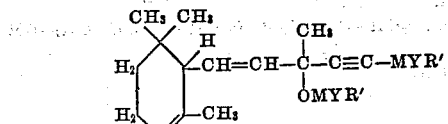

in which M is a metal selected from the group consisting of Li, Mg, and Zn; Y is a halogen and R' is a lower alkyl radical, but in which Y and R' are nonexistant if M is Li, R' is nonexistant if M is Mg or Zn and Y is a halogen, and Y is nonexistant if M is Mg or Zn, R' is a lower alkyl radical, and reacting the intermediate with a compound having the formula

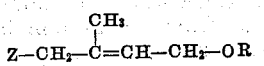

in which Z is a halogen and R is a lower alkyl radical, to produce a second intermediate of the formula

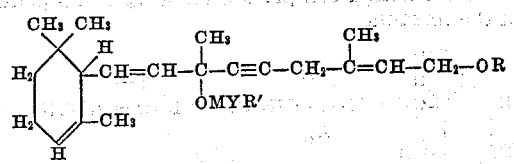

in which M, Y, R', and R have the same significance as above, and hydrolyzing the second intermediate to produce a compound of the formula

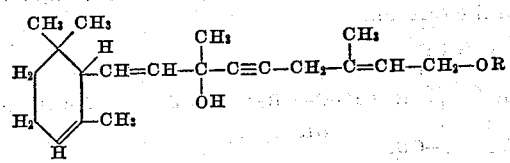

in which R has the same significance as above.

13. A method according to claim 12 in which Z is chlorine.

14. A method according to claim 12 in which Z is chlorine and R is methyl.

15. The method comprising reacting α-ethynyl-α-ionol with a reagent selected from the group consisting of R'Li, R'MgX, R'ZnX, R'₂Mg, and R'₂Zn, in which R' is a lower alkyl radical and X is a halogen, to produce an intermediate of the formula

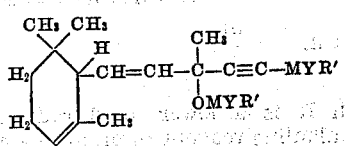

in which M is a metal selected from the group consisting of Li, Mg, and Zn; Y is a halogen and R' is a lower alkyl radical, but in which Y and R' are nonexistent if M is Li, R' is nonexistent if M is Mg or Zn and Y is a halogen, and Y is nonexistent if M is Mg or Zn, R' is a lower alkyl radical, and reacting the intermediate with a compound having the formula

Z—CH₂—C(CH₃)=CH—CH₂—OR in which Z is a halogen and R is a lower alkyl radical, to produce a second intermediate of the formula

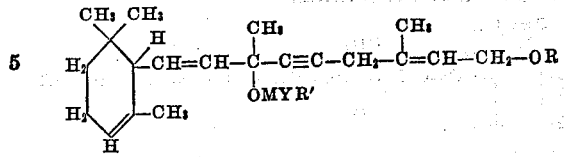

in which M, Y, R', and R have the same significance as above, hydrolyzing the second intermediate to produce a compound of the formula

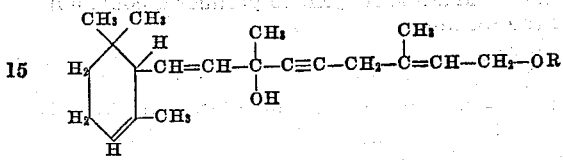

in which R has the same significance as above, and hydrogenating the acetylenic bond to produce a compound of the formula

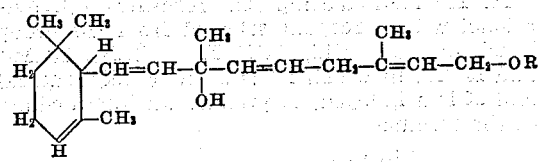

in which R has the same significance as above.

16. A method according to claim 15 in which Z is chlorine and R is methyl.

17. The method comprising reacting α-ethynyl-α-ionol with a reagent selected from the group consisting of R'Li, R'MgX, R'ZnX, R'₂Mg, and R'₂Zn, in which R' is a lower alkyl radical and X is a halogen, to produce an intermediate of the formula

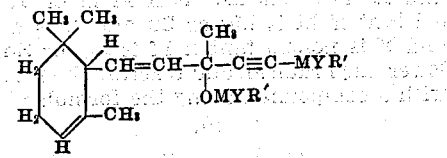

in which M is a metal selected from the group consisting of Li, Mg, and Zn; Y is a halogen and R' is a lower alkyl radical, but in which Y and R' are nonexistant if M is Li, R' is nonexistant if M is Mg or Zn and Y is a halogen, and Y is nonexistant if M is Mg or Zn, R' is a lower alkyl radical, and reacting the intermediate with a compound having the formula

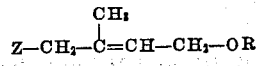

in which Z is a halogen and R is a lower alkyl radical, to produce a second intermediate of the formula

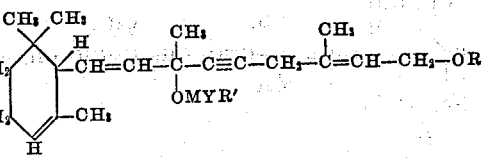

in which M, Y, R', and R have the same significance as above, hydrolyzing the second intermediate to produce a compound of the formula

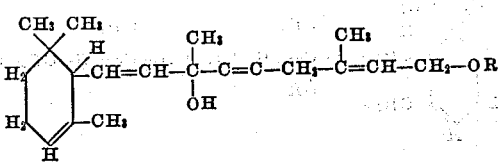

in which R has the same significance as above, hydrogenating the acetylenic bond to produce a compound of the formula

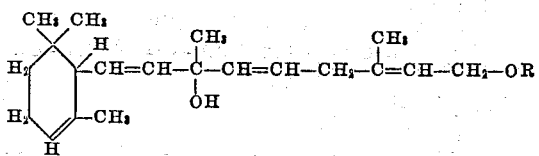

in which R has the same significance as above, and treating the hydrogenated product with a strongly alkaline reagent to produce a compound of the formula

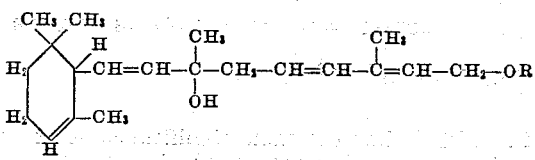

in which R has the same significance as above.

18. The method comprising reacting α-ethynyl-α-ionol with a reagent selected from the group consisting of R'Li, R'MgX, R'ZnX, R'₂Mg, and R'₂Zn, in which R' is a lower alkyl radical and X is a halogen, to produce an intermediate of the formula

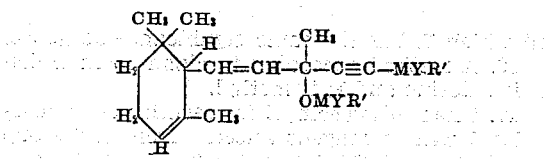

in which M is a metal selected from the group consisting of Li, Mg, and Zn; Y is a halogen and R' is a lower alkyl radical, but in which Y and R' are nonexistant if M is Li, R' is nonexistant if M is Mg or Zn and Y is a halogen, and Y is nonexistant if M is Mg or Zn, R' is a lower alkyl radical, and reacting the intermediate with a compound having the formula

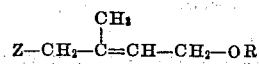

in which Z is a halogen and R is a lower alkyl radical, to produce a second intermediate of the formula

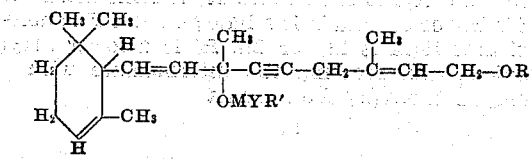

in which M, Y, R', and R have the same significance as above, hydrolyzing the second intermediate to produce a compound of the formula

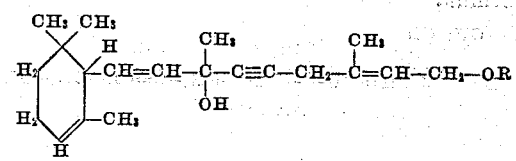

in which R has the same significance as above, hydrogenating the acetylenic bond to produce a compound of the formula

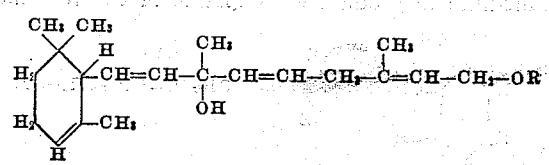

in which R has the same significance as above, treating the hydrogenated product with a strongly alkaline reagent to produce a compound of the formula

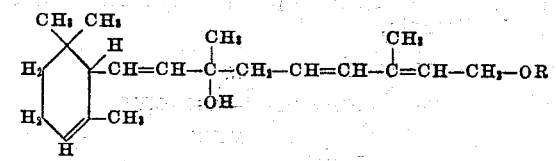

in which R has the same significance as above, and dehydrating to produce a compound having vitamin A activity.

19. A method according to claim 17 in which the reagent is R'MgX, Z is a halogen and R is a lower alkyl radical.

20. A method according to claim 18 in which the reagent is R'MgX, Z is a halogen, and R is a lower alkyl radical.

21. A method according to claim 17 in which the reagent is ethyl magnesium bromide, Z is chlorine and R is methyl.

22. A method according to claim 18 in which the reagent is ethyl magnesium bromide, Z is chlorine and R is methyl.

23. A method comprising treating a compound of the formula

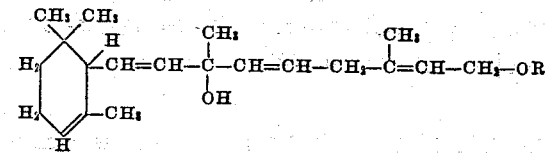

in which R is a lower alkyl radical, with a strongly alkaline reagent to produce a compound of the formula

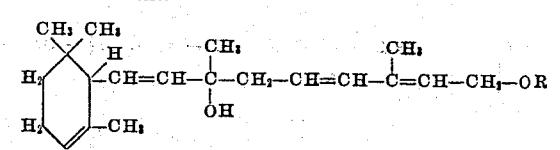

in which R has the same significance as above.

24. A method according to claim 23 in which R is methyl.

25. A method according to claim 24 in which the strongly alkaline reagent is sodium methylate.

26. A method comprising treating a compound of the formula

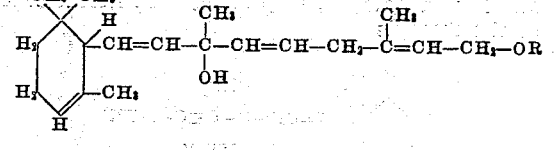

in which R is a lower alkyl radical, with a strongly alkaline reagent to produce a compound of the formula

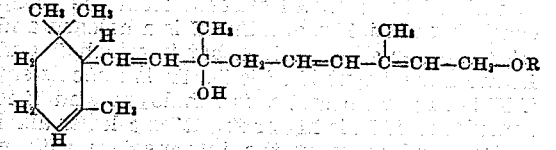

in which R has the same significance as above, and dehydrating to produce a compound having vitamin A activity.

27. A method according to claim 26 in which R is methyl.

28. A method according to claim 26 in which the strongly alkaline reagent is sodium methylate.

29. The method comprising treating a compound of the formula

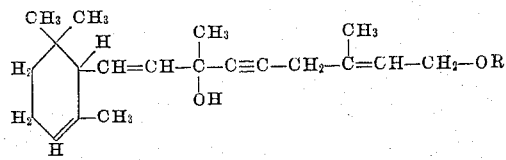

in which R is a lower alkyl radical, with a strongly alkaline reagent to produce a compound of the formula

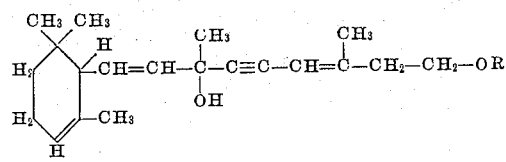

in which R has the same significance as above.

30. A method according to claim 29 in which R is methyl and the strongly alkaline reagent is sodium methylate.

31. The method comprising treating a compound of the formula

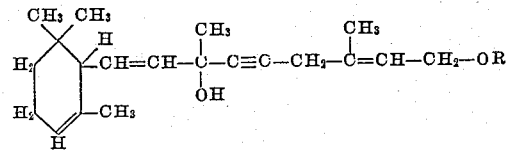

in which R is a lower alkyl radical, with a strongly alkaline reagent to produce a compound of the formula

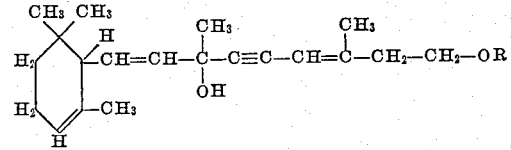

in which R has the same significance as above, and hydrogenating to produce a compound of the formula

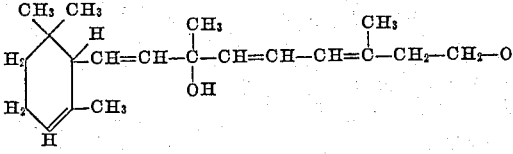

in which R has the same significance as above.

32. A method according to claim 31 in which the strongly alkaline reagent is sodium methylate.

33. The method comprising treating a compound of the formula

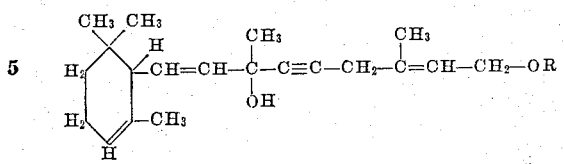

in which R is a lower alkyl radical, with a strongly alkaline reagent to produce a compound of the formula

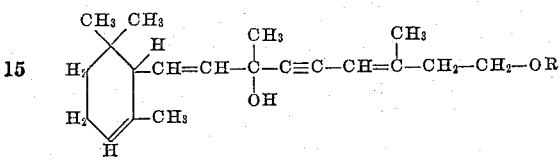

in which R has the same significance as above, and hydrogenating to produce a compound of the formula

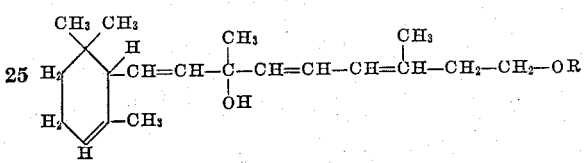

in which R has the same significance as above, and treating the hydrogenated compound with an acidic reagent, whereby isomerization and dehydration occurs, to produce a compound having vitamin A activity.

34. A method according to claim 33 in which the strongly alkaline reagent is sodium methoxide.

WILLIAM OROSHNIK.

REFERENCES CITED

The following references are of record in the file of this patent:

UNITED STATES PATENTS

| Number | Name | Date |
| --- | --- | --- |
| 2,369,157 | Milas | Feb. 13, 1945 |
| 2,369,159 | Milas | Feb. 13, 1945 |
| 2,369,161 | Milas | Feb. 13, 1945 |
| 2,369,164 | Milas | Feb. 13, 1945 |
| 2,382,068 | Milas | Aug. 14, 1945 |
| 2,412,465 | Milas | Dec. 10, 1946 |
| 2,425,201 | Oroshnik | Aug. 5, 1947 |

OTHER REFERENCES

Oroshnik, "Jour. Amer. Chem. Soc.," vol. 67 (1945), page 1627.